(No Model.)

G. F. SIMONDS.
BALL BEARING.

No. 449,962. Patented Apr. 7, 1891.

Witnesses,

Inventor:
George F. Simonds.
By James L. Norris
Atty.

UNITED STATES PATENT OFFICE.

GEORGE F. SIMONDS, OF FITCHBURG, MASSACHUSETTS.

BALL-BEARING.

SPECIFICATION forming part of Letters Patent No. 449,962, dated April 7, 1891.

Application filed December 30, 1890. Serial No. 376,288. (No model.)

*To all whom it may concern:*

Be it known that I, GEORGE FREDERICK SIMONDS, a citizen of the United States, residing at Fitchburg, in the county or Worcester and State of Massachusetts, have invented new and useful Improvements in Ball-Bearings, of which the following is a specification.

This invention relates to ball-bearings for diminishing friction; and it consists in the combination of a series of spherical rollers or balls surrounding a shaft or axle and adapted to resist end pressure or thrust and another series of spherical rollers or balls adapted to resist or sustain radial pressure, either or both of said series of balls being confined in a removable cage or cages, whereby an entire series of balls can be removed and replaced together, said cages being independent of the bearing-surfaces against which the balls act, and said balls for resisting end-pressure being arranged on a different diameter and in different planes from the balls for sustaining radial pressure or weight, as hereinafter more fully set forth.

My present invention, as herein shown and described, is particularly adapted to the axle and hub bearings of bicycles, but is also applicable to use in other situations.

Figure 1:
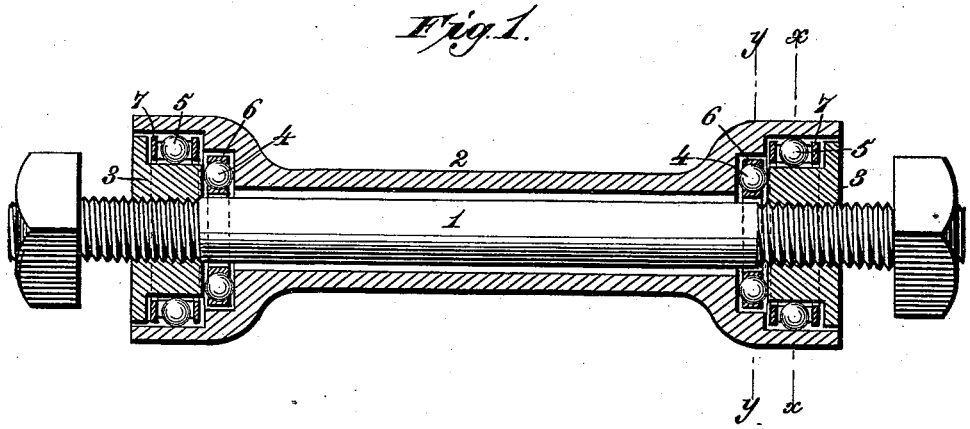
Figure 2:
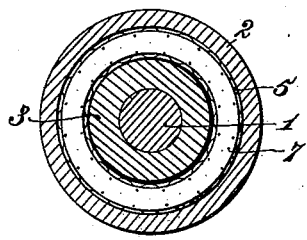
Figure 3:
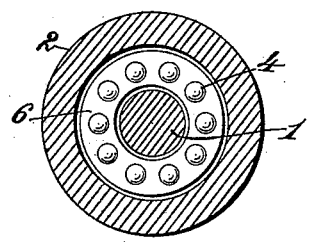

In the annexed drawings, illustrating the invention, Figure 1 represents the axle of a bicycle in side elevation with the hub, ball-bearings, and removable ball-cages in section. Fig. 2 is a transverse section on the line *x x* of Fig. 1, and Fig. 3 is a similar section on the line *y y* of the same figure.

Referring to the drawings, the numeral 1 designates a shaft or axle, and 2 is a wheel-hub or other rotating part surrounding said shaft.

On the ends of the shaft or axle 1 are secured the centrally-perforated and flanged disks 3, which are surrounded by the enlarged and recessed ends of the hub 2, and together therewith form the boxings for the spherical rollers or balls 4, that take the end-thrust of the hub, and the spherical rollers or balls 5, that sustain the radial pressure.

It will be observed that each set of spherical rollers or balls 4 is arranged in a circular series surrounding the shaft or axle 1 between the parallel and vertical plane surfaces of the hub 2 and one of the disks 3 in such position as to roll in contact with said surfaces and take the end pressure or thrust of the hub 2 from either direction.

Each set of spherical rollers or balls 5 is arranged in circular series between the adjacent concentric surfaces of the hub 2 and one of the disks 3 in such a manner as to roll on or in contact with said concentric surfaces and sustain the radial pressure or weight. It will thus be seen that the balls for sustaining radial pressure are arranged on a different diameter and in different planes from the balls that resist end-thrust, and which last-named balls 4 immediately surround the shaft or axle, as shown. By this arrangement of parts the employment of the independent sets of balls is readily provided for in a bearing of simple and compact construction that is of great advantage in a bicycle and other machines in which economy of space is desirable.

In order to facilitate the ready insertion and removal of a set of spherical rollers or balls in a body, each set is preferably confined in a removable cage 6 or 7 of the character described in an application, Serial No. 367,995, filed by me October 13, 1890.

The cage 6, Figs. 1 and 3, is provided with lateral openings for protrusion of the balls 4 in position to come in bearing contact with the opposite plane surfaces of the hub 2 and disk 3 to take end-thrust, while the cages 7 are formed with internal and peripheral openings or spaces that permit the balls 5 to project in contact with the concentric bearing-surfaces of the hub and disk for the purpose of sustaining radial pressure. Both of these cages 6 and 7 are independent of the bearing-surfaces against which the respective balls for taking end-thrust or resisting radial pressure act.

What I claim is—

1. In a ball-bearing, the combination of a series of balls surrounding a shaft or axle and confined in a removable cage and adapted to resist end pressure or thrust, and other balls confined in a removable cage and adapted to resist radial pressure, said balls for resisting end pressure being arranged on different diameters and in different planes from the balls for resisting radial pressure, and said cages being independent of the bearing-surfaces against which the respective balls for resisting end-thrust and radial pressure act, substantially as described.

2. In a ball-bearing, the combination of a series of balls surrounding a shaft or axle and adapted to resist end pressure or thrust thereof, parallel and vertical plane bearing-surfaces for said balls, a series of balls confined in a removable cage and adapted to resist radial pressure, and concentric bearing-surfaces for said last-named balls, said cage being independent of the concentric bearing-surfaces against which the balls for resisting radial pressure act, and the balls for resisting end pressure being arranged on different diameters and in different planes from the balls for resisting radial pressure, substantially as described.

3. In a ball-bearing, the combination of a series of balls surrounding a shaft or axle and confined in a removable cage in position to resist end pressure or thrust, parallel and vertical plane bearing-surfaces for said balls, said cage being independent of the parallel and vertical plane bearing-surfaces against which the balls for resisting end pressure act, and another series of balls arranged between concentric bearing-surfaces to resist radial pressure, said balls for resisting radial pressure being arranged on a different diameter and in different planes from the balls for resisting end-thrust, substantially as described.

In testimony whereof I have hereunto set my hand and affixed my seal in presence of two subscribing witnesses.

GEO. F. SIMONDS. [L. S.]

Witnesses:
  JAMES L. NORRIS,
  JAMES A. RUTHERFORD.